Nov. 4, 1969
C. J. COBERLY ET AL
3,476,413
FRICTION-TYPE JOINT WITH UNIFORM WALL THICKNESS
Filed Feb. 1, 1966
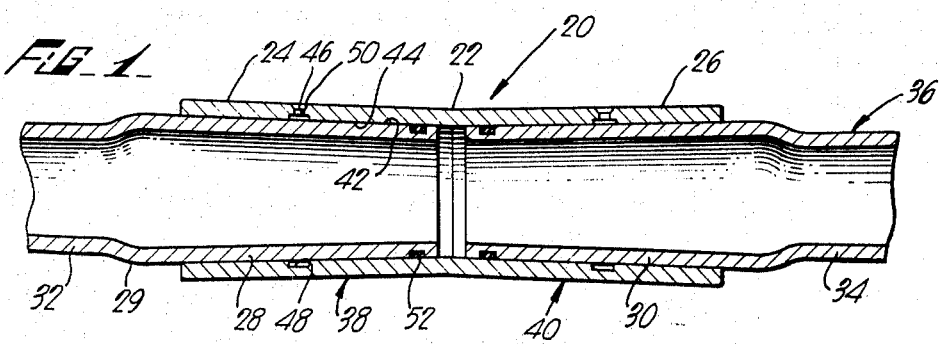
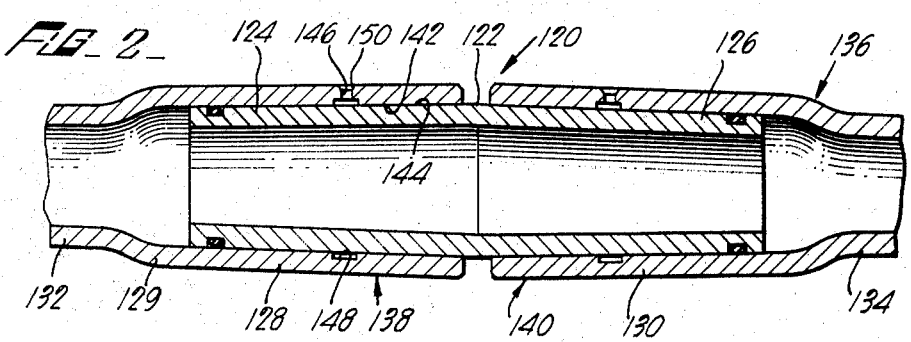
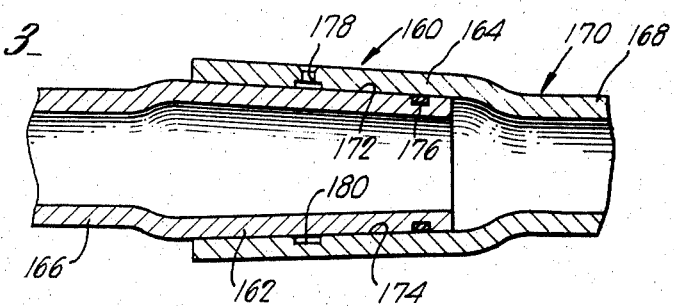
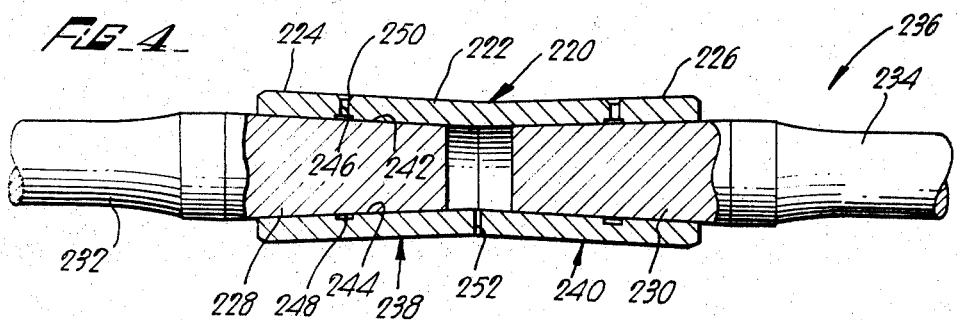
INVENTORS:
CLARENCE J. COBERLY,
FRANCIS BARTON BROWN,
BY THEIR ATTORNEYS,
HARRIS, KIECH, RUSSELL & KERN.

United States Patent Office 3,476,413
Patented Nov. 4, 1969

3,476,413
FRICTION-TYPE JOINT WITH UNIFORM
WALL THICKNESS
Clarence J. Coberly, San Marino, and Francis Barton
Brown, La Crescenta, Calif., assignors to Kobe, Inc.,
Huntington Park, Calif., a corporation of California
Continuation-in-part of application Ser. No. 325,707,
Nov. 22, 1963. This application Feb. 1, 1966, Ser.
No. 524,112
Int. Cl. F16l 35/00, 21/02, 19/00
U.S. Cl. 285—332.3                                    7 Claims This application is a continuation-in-part of our co-pending application Ser. No. 325,707, filed Nov. 22, 1963, which, in turn, is a continuation-in-part of our Patent No. 3,114,566, granted Dec. 17, 1963.

The invention constituting the subject matter of this application relates in general to a high-strength, friction-type joint for interconnecting such elongated elements as tubings or rods, usually in end-to-end, aligned relation, to form tubing or rod strings capable of withstanding high axial and/or torsion loads, and/or, in the case of tubing strings, high internal pressures. More particularly, the invention relates to, and a primary object thereof is to provide, a friction-type joint capable of utilizing frictionally engaged tapered surfaces wth unusually large included taper angles.

As general background, tubing or rod strings incorporating the high-strength, friction-type joint of the invention may include any number of elongated elements oriented in any direction. One important use of such a rod or tubing string is in a well with the string oriented vertically and subjected to high axial tension loads due to its weight. Additionally, such high axial tension loads may be due in part to a high internal pressure in the case of a tubing string, or a high pumping load in the case of a rod string. Alternatively, or additionally, the string may be subjected to high torsion loads, as in the case of a drill string.

The term "tubing" is used herein to include tubes or pipes of any lengths and wall thicknesses. Tubings may be classed as thin walled or thick walled relative to their outer diameters. Such classes of tubings differ in that, in a thin-walled tubing, any hoop stresses developed therein are substantially uniform throughout the thickness of the wall, whereas, in a thick-walled tubing, there is a distinct hoop stress gradient throughout the thickness of the wall. Tubings commonly used in oil wells may be regarded as falling into the thin-walled class, examples being tubings or pipes used in producing oil, drill pipe, casing, liners, and the like.

The term "rod" is used herein to cover solid, i.e., non-tubular, elongated elements. Rod strings are widely used in the oil industry for transmitting power from the surface to bottom hole pumps in oil wells, the rods commonly being referred to as "sucker rods."

Friction-type joints with which the method and apparatus of the invention may be used rely for axial and torsional strength predominantly or exclusively on frictional resistance to relative bodily displacement of axially tapered surfaces of an inner member and an outer, tubular member fitted over the inner member, the tapered surfaces being frictionally interengaged, usually in direct physical contact, with a high engagement or contact pressure therebetween along an interface which is substantially continuous and tapers substantially uniformly throughout the axial length of frictional interengagement between said tapered surfaces, and which has a small included angle. Both such members may be adjacent ends or end portions of adjoining elongated elements, or one may be an end or end portion of an elongated element and the other an end or end portion of a coupling. Normally, the coupling will have oppositely tapered end portions for pressural interengagement with complementarily tapered surfaces of adjacent ends of two elongated elements to be interconnected by the coupling. In most instances, the coupling is tubular and may be either internal or external with respect to the tubing or rod ends to be interconnected thereby.

It is important that the strength of such a friction-type joint against relative bodily displacement of its tapered surfaces should be at least nearly equal to the yield strength of the elongated elements it interconnects. While stresses in rod or tubing strings used in oil wells are within the elastic limit of the rods or tubings during normal use, it is important that none of the joints fail if higher stresses are transiently developed under unusual conditions. Under such circumstances, it is important that axial tension loads, for example, up to the yield strength, or even the ultimate strength, of the rods or tubings be applicable to the rod or tubing strings without failure of the joints thereof.

All conventional rod or tubing joints now in use are of the threaded variety and costly upsetting and heat treatment is required if the joint strength is to equal or exceed the tensile strength of the rod or tubing. In addition, threaded joints are necessarily bulky and occupy valuable space in the well. For example, it is often necessary to run two or more tubing strings side by side in a well casing and the size of conventional threaded joints limits the number of tubing strings that can be placed in the casing, or requires an increase in the size of the casing. It is a feature of the present friction-type joint that rods or tubings can be adequately connected in a rod or tubing string thereby in much less space than threaded joints. As compared with conventional practice, it is usually possible to employ well casings two full sizes smaller to contain an array of two or more parallel tubing strings, resulting in substantial savings in drilling and casing costs. Conversely, it becomes possible to use more or larger tubing strings in any existing casing or well. Generally similar considerations are applicable to rod strings using such a friction-type joint.

The strength of the present friction-type joint depends primarily on three factors, viz, the actual length of the interface throughout which the tapered surfaces are in pressural engagement, the effective coefficient of friction between the tapered surfaces, and the engagement pressure therebetween. The taper angle should be relatively small, but can vary throughout a relatively wide range as hereinafter discussed. It is desirable to provide the joint with a relatively high effective coefficient of friction and a very high engagement pressure between the tapered surfaces so that the length of the tapered surfaces in pressural interengagement can be relatively small. The foregoing factors can be so related as to produce a joint strength that is at least substantially equal to the yield strength of the rods or tubings interconnected by the joint. Ideally, the joint strength is equal to or exceeds the ultimate strength of the rods or tubings so that failure will occur in one of the rods or tubings, and not in the joint. It is surprising that a friction-type joint of such axial strength can be produced, but many tests have shown these results to be possible.

The desired high engagement pressure between the tapered surfaces of the inner and outer members of the friction-type joint is the result of a high hoop tension stress in the outer member and an opposing high compression stress in the inner member. To achieve maximum joint strength, these stresses approximate, but are slightly below, the yield strengths of the materials of the two members.

The high hoop tension stress in the outer member establishes therein an initial axial compression stress which, according to Poisson's ratio for steel, is approximately equal to 0.3 times the hoop tension stress. Such an initial axial compression tends to reduce the axial length of the outer member and tends to increase its taper angle to a related extent. Likewise, the opposing high compression stress in the inner member establishes therein an initial axial tension equal to about 0.3 times the stress in question. This similarly tends to lengthen the inner member and tends to decrease its taper angle. However, it has been found that the actual taper-angle changes are insignificant and do not affect the joint strength significantly.

Still another factor is that in applying an axial make up force to the members in making up the joint, the inner member may be subjected to an axial compressive stress tending to increase its diameter. Upon relaxation of the make up force, the diameter of the inner member tends to decrease to its original value, which would appear to tend to weaken the joint by reducing the engagement pressure. However, this effect has been found to be insignificant.

An external axial load applied to one of the members of the joint is transferred progressively to the other along the length of the interface throughout which the two tapered surfaces are pressurally interengaged. An axial tensile stress due to an axial tension load is additive with respect to the initial axial tension stress in the inner member. Likewise, the axial tension stress due to such an axial load reduces the initial axial compression stress in the outer member to the point of changing it to a net axial tension stress along most of the length of the interface.

The engagement pressure between the tapered surfaces induced by the hoop tension and compression stresses in the outer and inner members changes upon application of such an axial load to one of the members. If it is assumed that initially the engagement pressure or interference fit between the surfaces was uniform along the interface, application of such an axial load will increase the contact pressure or interference fit near one end of the interface and decrease same near the other end thereof, only an intermediate portion of the interface being free of such effects. Likewise, application of such an axial load has been found to cause relative axial movement between the engaged tapered surfaces at positions near the ends of the interface.

It thus becomes apparent that any analysis of the stresses in the joint under initial and loaded conditions becomes extremely complex. Many of the factors noted above as concerns initial stress and change in stress upon axial loading might seem to indicate that no friction-type joint could be designed that would not pull apart at loads equal to the nominal yield strength or the nominal ultimate strength of the rods or tubings. Tests have shown, however, that a friction-type joint can be provided meeting these conditions without failure. It has been found that the change in axial stress in the members due to axial loading, change in engagement pressure or interference fit between the tapered surfaces upon such loading, and the relative movement between such surfaces upon such loading, are not such as to preclude a friction-type joint having a strength greater than the yield or even the ultimate strength of the rods or tubings.

The friction-type joint is preferably so constructed that the outer tubular member will grip the inner member tighter upon the application of an axial tension load. The materials and dimensions of the inner and outer members may be so selected and related that at least a portion of the outer member contracts relative to the inner member upon application of an axial tension load to thereby increase the engagement pressure between the tapered surfaces adjacent such portion. This effect may be enhanced very considerably by utilizing for the inner member a material having an appreciably higher modulus of elasticity than the material of the outer member.

The tapered surfaces of the inner and outer members may be in direct physical contact along the interface and may be roughened to increase the effective coefficient of friction therebetween. Alternatively, the tapered surfaces may be in pressural interengagement without direct physical contact, but with a keying agent disposed between and embedded in the tapered surfaces along the interface to increase the effective coefficient of friction therebetween, particularly where the joint must resist relative bodily displacement of the tapered surfaces under torsional stress.

Preferably, in instances where adjacent rod or tubing ends are interconnected by couplings, the rod or tubing ends are cold worked to provide same with higher unit yield strengths than the nominal yield strengths of the bodies of the rods or tubings, thereby increasing the over-all strengths of the joints.

In most of the friction-type joints hereinafter considered, the tapered surfaces are unthreaded and the joints are made up by relative axial displacement of the inner and outer members without relative rotation thereof. In some instances, however, the tapered surfaces may be provided with shallow, wide, tapered threads having flat crest and root surfaces which form the pressurally interengaged tapered surfaces serving to frictionally prevent relative bodily displacement of the inner and outer members. In this instance, the threads merely serve to relatively axially displace the inner and outer members in response to rotation thereof, the inner and outer members being held together primarily by friction resulting from pressural interengagement of the root and crest surfaces, and only incidentally by any mechanical interlock between the threads.

The invention further contemplates achieving the desired high hoop tension and compression stresses in the outer and inner members by shrinking the outer member on the inner, and, more particularly, by shrinking the outer member on the inner hydraulically. This permits the joint to be made up easily, and also permits the joint to be broken readily. Also, the joint may be made up and broken repeatedly in this manner.

More specifically, the invention contemplates hydraulically shrinking the outer member on the inner in such a manner that the materials of the outer and inner members are stressed substantially to, but not quite to, their yield points to achieve the maximum possible engagement pressure between the tapered surfaces of the members, whereby to achieve maximum joint strength. Preferably, a fluid, such as oil, is injected into an axially central region of the interface between the tapered surfaces of the inner and outer members under sufficient pressure to stress the materials of these members substantially to, but not quite to, their respective yield points in the central region, which results in radial separation of the tapered surfaces in such region. The injected fluid is prevented from escaping from the central region by sealing engagement of the tapered surfaces in annular sealing regions at opposite ends of the central region.

In making up the tapered joint in accordance with the foregoing, the inner and outer members are relatively moved axially into successively further inserted positions of the inner member as the pressure of the fluid injected into the central region of the interface builds up, simultaneously relatively rotating the members if the tapered surfaces are threaded, thereby maintaining the tapered surfaces in sealing engagement in the sealing regions at the ends of the central region. When the injection pressure and the axial make up force reach their maximum values, the joint is fully made up and the pressure of the injected fluid in the central region is reduced substantially to atmospheric to permit outward expansion of the contracted portion of the inner member and inward contraction of the expanded portion of the outer member, thereby producing the desired high engagement pressure between the tapered surfaces of the two members with hoop tension and compression stresses in the outer and inner members substantially, but not quite, equal to the yield points of the materials of these members.

In breaking the joint, the foregoing procedure is essentially reversed, the pressure of the injected fluid in the central region serving to separate the tapered surfaces of the inner and outer members in this region so that the inner and outer members may be axially separated. Such axial separation is produced entirely by, or at least aided by, the action of the pressure of the injected fluid on the projected areas of the tapered surfaces.

Only relatively light engagement pressures are necessary in the sealing regions to prevent the escape of the injected fluid from the central region in making up and breaking the joint, so that, with the foregoing procedure, the joint can be made up easily, and broken readily, without galling the tapered surfaces, irrespective of whether they are unthreaded or threaded. Consequently, the joint can be made up and broken repeatedly in accordance with the invention without impairing the effectiveness of the tapered surfaces, which is an important feature.

With the foregoing as background, an important object of the invention is to provide a high-strength, friction-type joint of the character outlined wherein the outer, tubular member has a substantially constant wall thickness throughout at least a major portion of the length of the interface between the inner tapered surface within the outer member and the outer tapered surface on the inner member. Preferably, where the inner member is tubular, it also has a substantially constant wall thickness throughout at least a major portion of the length of the interface.

With the foregoing construction, the outer member is capable of withstanding a higher hoop tension. If the inner member is also tubular and of substantially constant wall thickness, it is capable of withstanding a higher hoop compression. The effect of this is that the included taper angle of the tapered surfaces of the outer and inner members may be higher than in the case of outer and inner member having tapering wall thickness, which is an important feature of the invention.

The foregoing objects, advantages, features and results of the present invention, together with various other objects, advantages, features and results thereof which will be evident to those skilled in the art to which the invention relates in the light of this disclosure, may be achieved with the exemplary embodiments of the invention described in detail hereinafter and illustrated in the accompanying drawing, in which:

FIG. 1 is a longitudinal sectional view illustrating a high-strength, friction-type, external-coupling tubing joint of the invention;

FIG. 2 is a longitudinal sectional view illustrating a high-strength, friction-type, internal-coupling tubing joint of the invention;

FIG. 3 is a longitudinal sectional view illustrating a high-strength, friction-type, bell-and-spigot-type tubing joint of the invention; and FIG. 4 is a longitudinal sectional view illustrating a high-strength, friction-type, external-coupling rod joint of the invention.

Initially, various factors entering into the structure of the external-coupling joint of FIG. 1 will be described, with the understanding that such description is also applicable to the joints of FIGS. 2 to 4, except as otherwise noted. Incorporated in such description will be a discussion of the effect of making the outer and inner members of the joint of FIG. 1 of substantially constant wall thickness. Subsequently, the structures of the joints of FIGS. 2 to 4 will be described briefly, and the effect of making the tubular members thereof of substantially constant wall thicknesses will be discussed.

Tubing joint construction 20

Referring to FIG. 1, illustrated therein is a coupling-type tubing joint construction 20 of the invention comprising an external coupling 22 the respective end portions or ends 24 and 26 of which receive therein, in closely spaced relation, adjacent end portions or ends 28 and 30 of tubings 32 and 34 forming a tubing string 36. The coupling and tubing ends 24 and 28 form a tubing joint 38 and the coupling and tubing ends 26 and 30 form a tubing joint 40. The two tubing joints 38 and 40 are identical so that only the former will be considered.

The inner member of the tubing joint 38, i.e., the tubing end 28, is provided with a tapered outer surface 42 which converges axially inwardly relative to the coupling 22. The outer member of the tubing joint 38, i.e., the coupling end 24, is provided with a complementarily tapered inner surface 44. The two tapered surfaces 42 and 44 are pressurally interengaged along the interface therebetween with a high engagement pressure induced by a high hoop tension stress in the coupling end 24 and an opposing high hoop compression stress in the tubing end 28. As will be discussed in detail hereinafter, the axial length of the tapered surfaces 42 and 44 in pressural interengagement with each other is so related to the high engagement pressure between the tapered surfaces and the effective coefficient of friction therebetween as to produce a frictional resistance to relative bodily displacement of the tapered surfaces, either axially or circumferentially, sufficiently high to develop a joint strength at least nearly equal to the yield strength of the tubing 32. As will be discussed, the strength of the joint 38 may also attain or exceed the ultimate strength of the tubing 32.

The foregoing high frictional resistance to relative bodily displacement of the tapered surfaces 42 and 44 is preferably achieved by shrinking the coupling end 24 onto the tubing end 28, and particularly by hydraulically shrinking the coupling end onto the tubing end. Considering how this may be accomplished, the coupling end 24 is provided at approximately the axial midpoint of its tapered surface 44 with a port 46 for injecting a fluid, such as oil, under high pressure into the axially central region of the annular interface between the tapered surfaces 42 and 44. The port 46 communicates at its inner end with an internal annular groove 48 in the coupling end 24, and is provided at its outer end with a radially-inwardly-convergent annular seat 50 for a suitable fluid injection nozzle.

In making up the tubing joint 38, the tubing end 28 is inserted in the coupling end 24 until the tapered surface 42 engages the tapered surface 44 in the central region of the interface therebetween and in annular sealing regions on axially opposite sides of the port 46. Oil, or other fluid, under high pressure, which pressure may be as high as 30,000 p.s.i., or more, is then injected into the annular central region of the interface between the two tapered surfaces, at the same time applying an axial make up force to the coupling 22 and the tubing 32 tending to further insert the tubing end 28 into the coupling end 24. The high fluid pressure within the central region of the interface expands the adjacent portion of the coupling end 24 outwardly and contracts the adjacent portion of the tubing end 28 inwardly, without, however, breaking contact in the annular sealing regions on axially opposite sides of the central region so long as a sufficiently high axial make up force is applied. This make up force must be high enough to resist the action of the injection pressure on the axially projected areas of the tapered surfaces 42 and 44. Thus, the injected fluid is trapped in the annular central region of the interface.

As the pressure of the trapped fluid builds up, the coupling and tubing ends 24 and 28 are caused to be moved axially toward each other by the axial make up force to increase the extent to which the tubing end is inserted into the coupling end. After the maximum injection pressure and the maximum axial make up force for which the tubing joint 38 is designed have been reached, the tubing end 28 is in effect "bottomed" within the coupling end 24. (Such "bottoming" is solely the result of interengagement of the tapered surfaces 42 and 44, there being no annular shoulders, or the like, to artificially limit insertion.) Then, the application of the injection pressure is discontinued and the excess injected fluid is permitted to escape through the port 46. This permits the outwardly expanded portion of the coupling end 24 to contract inwardly, and simultaneously permits the inwardly contracted portion of the tubing end 28 to expand outwardly. The result is that the coupling end 24 is shrunk onto the tubing end 28 with a high engagement pressure determined by the maximum injection pressure and the maximum axial make up force.

It will be apparent that, in order to break the tubing joint 38, a similar procedure is followed. The injection pressure acting on the axially projected areas of the tapered surfaces 42 and 44 is normally sufficient to produce axial separation of the coupling and tubing ends 24 and 28. Actually, it may be necessary to restrain such axial separation.

When making up and breaking the tubing joint 38, the major portions of the tapered surfaces 42 and 44 intermediate the ends thereof are physically separated by the injected fluid, the latter being trapped in the central region of the interface with contact pressures between the tapered surfaces at the ends of the interface which are not excessively high. Consequently, galling of the tapered surfaces 42 and 44 in response to relative axial movement thereof in making up and breaking the joint 38 does not occur despite very high engagement pressures between the tapered surfaces when the joint is made up. Therefore, the joint 38 may be made up and broken repeatedly.

An annular seal 52, shown as located in an external annular groove in the tubing end 28 adjacent its innermost extremity, may be disposed between the tapered surfaces 42 and 44 adjacent the inner end of the interface therebetween. This seal prevents any internal pressure which may be developed in the tubing string 36 in use from being applied to the interface between the tapered surfaces 42 and 44 to tend to break the tubing joint 38. Any internal fluid which may leak past the annular seal 52 into the interface between the tapered surfaces 42 and 44 escapes by way of the annular groove 48 and the port 46. Consequently, no joint-loosening pressure can build up in the interface, being constantly bled off.

It will also be noted from the foregoing that any internal pressure which may exist in the tubing string 36 in use merely tends to tighten the tubing joint 38 since it acts outwardly on the tubing end 28 to tend to expand it into more positive engagement with the coupling end 24. To prevent the internal pressure from having any significant expanding effect on the coupling 22 itself, the axial separation between the innermost extremities of the two tubing ends 28 and 30 is kept as small as practicable to minimize the coupling area on which the internal pressure can act.

With the foregoing as general background, various important considerations which enter into the structure of the tubing joint 38, and into the materials used for the coupling 22 and the tubing 32, will now be discussed. It should be kept in mind that, with exceptions which will be pointed out, these considerations are also applicable to the tubing and rod joint species of the invention which will be described hereinafter.

In general, the axial length of the tapered surfaces 42 and 44 in pressural interengagement with each other, the engagement pressure between the tapered surfaces resulting from the hoop tension and compression stresses in the coupling and tubing ends 24 and 28, and the effective coefficient of friction between the surfaces, are so related as to produce a frictional resistance to relative bodily displacement of the tapered surfaces sufficiently high to develop a high-strength friction-type tubing joint 38, the joint strength being at least nearly equal to the nominal yield strength of the tubing 32 and, under some conditions at least nearly equal to, or even exceeding, the ultimate strength of the tubing.

More particularly, the joint strength may be increased by increasing the axial length of pressural interengagement between the tapered surfaces 42 and 44, the effective coefficient of static friction therebetween, or the engagement pressure therebetween. To avoid an excessively long tubing joint 38, the axial length of the tapered surfaces 42 and 44 is preferably kept as small as possible, which means that it is necessary to make the engagement pressure and the effective coefficient of friction as high as possible, at the same time keeping the included angle of the tapered surfaces relatively small.

Considering the matter of the axial length of the interface between the tapered surfaces 42 and 44 in more detail, this length must be at least about 0.5 times the outside diameter of the body of the tubing 32 to obtain the desired high joint strength. However, the maximum axial length of the interface may be as much as about 6.0 times the outside diameter of the tubing 32 without being excessive for some applications, but is preferably not more than about 3.0 times the outside diameter of the tubing to be commercially practicable for all applications. (These ranges of ratios of the axial interface length to the outside diameter of the elongated element of the joint are also applicable to the other tubing and rod joint species hereinafter disclosed.)

The axial length of the tapered surfaces 42 and 44 in pressural interengagement in the made up tubing joint 38 may be minimized in various ways. One way is to utilize hoop tension and compression stresses in the coupling and tubing ends 24 and 28 which are as high as possible, thereby achieving as high an engagement pressure between the tapered surfaces as possible. Preferably, in the absence of applied loads, the hoop stresses are close to but slightly less than the respective yield points of the materials of which the coupling and tubing ends 24 and 28 are made. With stresses close to the yield points, the interface length to elongated-element outside diameter ratio discussed above may be held within the preferred range of 0.5 to 3.0. (Various factors involved in selecting materials for the coupling 22 and the tubing 32 will be considered hereinafter, as will various factors entering into the selection of radial dimensions for the coupling and tubing ends 24 and 28.)

The other principal factor determining the length of the interface between the tapered surfaces 42 and 44 is, as hereinbefore indicated, the effective coefficient of friction, which is preferably made as large as possible. With the materials normally used for tubings and couplings in the oil industry, and with the surface roughnesses normally encountered, the effective coefficient of friction is in the neighborhood of 0.20. However, in some instances, a value as low as about 0.1 may be used without departing from the interface length to elongated-element outside diameter ratio ranges given above. Also, much higher effective coefficients of friction much higher than this, up to as high as the order of 0.80, can be achieved. For example, either or both of the tapered surfaces 42 and 44 may be roughened artificially, as by knurling, etching, sand blasting, plating in such a way as to roughen, and the like. As another example, various keying agents capable of embedding themselves in the tapered surfaces 42 and 44 may be inserted therebetween.

The foregoing effective coefficient of friction range is also applicable to the tubing and rod joint species hereinafter disclosed.

The included angle of the tapered surfaces 42 and 44 enters into the axial length of engagement of the surfaces, but only to the extent of reducing the influence of the effective coefficient of friction by the tangent of one-half its value. Theoretically, the included taper angle could be 0°, but, as a practical matter, to facilitate insertion of the tubing end 28 into the coupling end 24, and to limit the variation in depth of insertion of the tubing end into the coupling with practical diameters and angle tolerances the minimum included angle taper should be not less than about 0° 30′.

It will be noted that the wall thicknesses of the coupling and tubing ends 24 and 28 are shown as substantially constant throughout the entire axial length of pressural interengagement therebetween. This effect is achieved by flaring the entire coupling end 24 with the desired taper and by correspondingly tapering the entire tubing end 28. To avoiding reducing the net inside diameter of the tubing end 28 at its innermost extremity, the tubing end may initially be expanded, as indicated at 29.

Since the coupling and tubing ends 24 and 28 have constant wall thicknesses, they are capable of withstanding maximum hoop tension and hoop compression, respectively, as compared to coupling and tubing ends, not shown, having tapered wall thicknesses. Consequently, all else being equal, the maximum possible engagement force between the coupling and tubing ends 24 and 28 is achieved. One effect of this is to permit a reduction in the axial length of pressural interengagement between the coupling and tubing ends for the same joint strength. Another possible effect is a reduction in the effective coefficient of friction for the same joint strength. Still another effect is that the included taper angle of the tapered surfaces 42 and 44 may be higher, for the same joint strength, as compared to coupling and tubing ends, not shown, having tapering wall thicknesses. For example, with this construction, the included taper angle of the tapered surfaces 42 and 44 may range from 0° 30′ to as high as in the neighborhood of 18°, the upper limit being determined primarily by the maximum permissible outside diameter of the tubing joint. Thus, making the coupling and tubing ends 24 and 28 with constant wall thicknesses throughout the axial length of interengagement therebetween, or throughout at least a major portion of such axial length, has various advantages, which is an important feature.

The foregoing included taper angle range is also applicable to the tubing and rod joint species hereinafter disclosed.

Turning now to a discussion of still other important considerations involved in the tubing joint 38, it will be recalled that the high hoop tension and compression stresses in the coupling and tubing ends 24 and 28 respectively establish axial compression and tension stresses in the coupling and tubing ends which, according to Poisson's ratio, are, for steel, approximately equal to 0.3 times the respective hoop tension and compression stresses. Consequently, an axial tension load applied to the tubing 32 tends to decrease the initial axial compression stress in the coupling end 24 and to increase the initial axial tension stress in the tubing end 28, the compression stress in the coupling end 24 reversing and becoming a net axial tension stress upon application of a sufficiently high axial tension load. Because of this effect, the wall thickness of the coupling end 24 can be reduced, and can be further reduced by utilizing for the coupling 22 a material having a higher yield strength than the material of the tubing end 28. Thus, the coupling 22 can be considerably thinner than the tubing 32, as shown in FIG. 1 of the drawings. This is important because it reduces the over-all diameter of the tubing joint 38, which is of significance in areas, such as oil wells, where space is at a premium.

One effect of such a relatively thin coupling 22 is that, when an axial tension load is applied to the tubing 32, the coupling end 24, on the average, contracts more than the tubing end 28. Therefore, under these conditions, the engagement pressure between the tapered surfaces 42 and 44 actually increases with an increase in the tension load, as long as the stresses in the coupling and tubing ends are below the yield stresses. This is important because it increases the strength of the tubing joint 38.

As the axial tension stress in the tubing end 28 exceeds the tensile yield stress, with the stress in the coupling still within the elastic limit, the tubing end will contract faster than the coupling end 24, with the result that the engagement pressure between the tapered surfaces 42 and 44 will be reduced, and with the ultimate result that the tubing joint 38 will fail by pulling the tubing end out of the coupling end. This effect is heightened by the initial axial tension stress in the tubing end 28 induced by the shrink fit between the coupling and tubing ends. As the axial tension load on the tubing 32 is progressively increased, the axial tension stress in the tubing 32 first exceeds the yield strength in tension near or within the interface between the tapered surfaces 42 and 44. The result is that the tubing joint 38 fails by necking down of the tubing end 28, starting near the outer extremity of the coupling end 24, and progressing axially into the interior of the coupling end.

To offset the foregoing effect and thus obtain a tubing joint 38 having a higher strength in tension, several alternatives are possible. First, the elastic limit of the tubing end 28 may be increased by cold working. Second, the tubing end 28 might be provided with a greater wall thickness than the nominal wall thickness of the tubing 32. Third, both the elastic limit and the wall thickness of the tubing end 28 can be increased by cold working. By cold working the tubing end 28 to increase its elastic limit only, a joint strength at least equal to the yield strength of the tubing 32 can be attained. By cold working the tubing end 28 to increase its elastic limit and by cold upsetting it to increase its wall thickness, the strength of the tubing joint 38 can be made to exceed the ultimate strength of the tubing 32, whereupon failure occurs in the body of the tubing outside the joint 38. This effect may be achieved with a thickness increase of the order of 10% to 15%, which adds only a few hundredths of an inch to the outer diameter of the tubing end 28.

Throughout all of the foregoing discussion of the tubing joint 38, it has been assumed that the moduli of elasticity of the materials of the coupling and tubing ends 24 and 28 are substantially equal. This assumption holds for coupling and tubing ends of steel even if the two members are made of steels having quite-different physical properties. With the steels normally used for oil well tubings and couplings, the variation in modulus of elasticity will not be more than a few percent, which has only a negligible effect on the strength of the tubing joint 38. However, a significant effect can be achieved by utilizing for the coupling 22 a material having a relatively low modulus of elasticity, but as high a strength as possible, and by using for the tubing 32 a material having a relatively high modulus of elasticity. For example, high strength aluminum alloys might be used for the coupling 22 and steel for the tubing 32. With such materials, the coupling end 24 would contract more than twice as much as the tubing end 28 for a given axial tension load, thereby producing a very substantial increase in the contact pressure between the tapered surfaces 42 and 44 as the axial tension load is increased. With such a construction, a joint strength at least as high as the ultimate tubing strength can readily be achieved. However, it would be necessary to utilize a relatively thick walled coupling 22 because of the present impossibility of obtaining materials having a modulus of elasticity which is low as compared to that of steel, but having a strength which is as high as that of steel. Nevertheless, where the wall thickness of the coupling 22 is not a factor, such a construction is entirely practical.

Tubing joint construction 120

Referring to FIG. 2 of the drawing, illustrated therein is a tubing joint construction 120 which is generally similar to the tubing joint construction 20, the various components of the tubing joint construction 120 being identified by reference numerals higher by one hundred than those used in connection with the corresponding components of the tubing joint construction 20.

Considering only the differences between the tubing joint 138 and the tubing joint 38, the coupling end or portion 124 is inserted into the tubing end 128 and the fluid injection port 146 is formed in the tubing end. The annular seal 149 for minimizing leakage into the interface between the tapered surfaces 142 and 144 is carried by the coupling portion 124 adjacent its end. To permit providing the coupling 122 with an inner diameter equal to the inner diameter of the tubing 132, the tubing end 128 is expanded or belled. This is preferably done by cold working to increase the elastic limit of the tubing material forming the tubing end 128.

In general, the discussion presented previously in connection with the tubing joint 38 applies to the tubing joint 138. In other words, the previously presented ranges of ratios of axial interface length to elongated-element outside diameter, ranges of effective coefficients of friction, and ranges of included taper angles, all apply, as do the described ways of increasing the effective coefficient of friction.

While most of the important considerations applicable to the tubing joint 38 are also applicable to the tubing joint 138, the internal coupling version does behave differently in a respect which is highly advantageous. More specifically, with the internal coupling 122, the tubing end 128 has an initial axial compression stress, due to the hoop tension stress therein, which reduces the net axial tension stress when the tubing 132 is subjected to an axial tension load. Therefore, without upsetting or severe cold working of the tubing end 128, the strength of the tubing joint 138 can easily be made to exceed the ultimate strength of the tubing 132. Consider, for example, a tubing 132 having a yield strength in tension of 40,000 p.s.i. The initial hoop tension stress in the tubing end 128, resulting from the high engagement pressure of the shrink fit, is at least nearly equal to the yield strength of the material. This gives an axial compression in the tubing end 128 of 0.3 times the yield, which subtracts from the tensile stress in the tubing end, making the stress therein at the end of the internal coupling portion 124 only about 28,000 p.s.i. when the tubing 132 itself is stressed to 40,000 p.s.i. When this yield point is exceeded the tubing will begin to neck down, but the point where failure starts will always be spaced from the coupling 122 because of the reduced tensile stress in the tubing end. The tensile load in the tubing 132 increases the gripping action of the tubing onto the coupling at the end of the coupling portion 124. The magnitude of this increase is directly proportional to the tensile load up to the elastic limit of the material. When the stress is raised above the elastic limit in the tubing end, the contraction and gripping action is more than directly proportional to the increased tensile load. Tubing having a yield strength of 40,000 p.s.i. will have an ultimate strength of approximately 60,000 p.s.i. But since the net tensile stress in the tubing end is only 70% (1—0.3) of that at a point remote from the coupling even at the ultimate at that point, the stress in the ubing end is only slightly above the yield point. With higher strength steels the yield point and ultimate are even closer together. Therefore with this form of joint the gripping action always increases with load even when the tubing is stressed beyond the yield point and the axial stress in the tubing end is always less than in the body of the tubing. Consequently, with the internal coupling 122, failure occurs in the tubing 132 proper at a point spaced from the coupling, and never in the tubing joint 138 itself. The foregoing effect is amplified by the cold working necessary to expand or bell the tubing end 128 to receive the corresponding coupling end 124. Thus, with the tubing joint 138, a joint strength in excess of the ultimate strength of the tubings can easily be attained, which is an important advantage of the internal coupling species of the invention.

As in the case of the external coupling 22, the internal coupling 122 is preferably made of higher strength material and thinner than the tubing ends 128 and 130, thereby saving space, which is particularly important in an oil well. Further space savings can be achieved by utilizing for the internal coupling 122 a material having a modulus of elasticity much higher than the modulus of elasticity of the tubings 132 and 134. For example, the tubings can be made of steel and the internal coupling 122 of tungsten, which has a modulus of elasticity approximately two-thirds greater than that of steel. Consequently, the tubing ends will contract more than the internal coupling for the same tensile stress, thereby causing the tubing ends to grip the coupling more and more tightly as the stress is increased within the elastic limit. The same effect can also be obtained by using tubing of aluminum alloy with internal couplings of steel. Consequently, a joint strength in excess of the ultimate strength of the tubings can easily be achieved with an extremely thin internal coupling.

As in the case of the coupling and tubing ends 24 and 28, the coupling and tubing ends 124 and 128 are of substantially uniform thicknesses throughout the entire axial length of pressural interengagement therebetween. With this construction, a higher hoop tension and a higher hoop compression can be developed in the tubing and coupling ends 128 and 124, respectively, thereby achieving advantageous results similar to those hereinbefore discussed in connection with the coupling and tubing ends 24 and 28.

Preferably, the tubing end 128 is belled sufficiently at 129 to permit a minimum inside diameter for the coupling 122 equal to the inside diameter of the tubing 132.

Tubing joint construction 160

Instead of frictionally interconnecting two tubings in end-to-end relation by means of a tubing joint construction which includes a coupling, they may be frictionally interconnected directly, without a coupling, by means of a bell-and-spigot-type of tubing joint 160, as shown in FIG. 3 of the drawing. The tubing joint 160 includes a tubing end 162, of a tubing 166, frictionally held in a tubing end 164, of a tubing 168, the two tubings forming a tubing string 170. The tubing ends 162 and 164 respectively have frictionally interengaged tapered surfaces 172 and 174. Fluid leakage into the interface between the tapered surfaces 172 and 174 is prevented by an annular seal 176 carried by the tubing end 162 adjacent its extremity. The outer tubing end 164 is provided with an injection port 178 communicating with an internal annular groove 180 therein to permit injection of fluid under high pressure in making up or breaking the tubing joint 160. The tubing end 164 is expanded or belled to receive the tubing end 162, the latter also preferably being expanded sufficiently to make its smallest inner diameter at least equal to the inner diameters of the tubings 166 and 168 to minimize any restriction to fluid flow through the tubing joint 160. In the tubing joint 160, the wall thicknesses of the tubing ends 162 and 164 are shown as constant throughout the axial length of pressural interengagement therebetween to achieve maximum hoop compression and hoop tension therein, respectively.

The various important considerations hereinbefore discussed in connection with the coupling-type tubing joint 38 are applicable to the tubing joint 160, except for those involving the use of different materials, or materials with different physical properties, for the inner and outer members. In the tubing joint 160, the inner and outer members, being integral with the tubings, must be formed of the same materials and materials having substantially the same physical properties, although certain physical properties can be varied by differentially cold working the inner and outer members.

Rod joint construction 220

Illustrated in FIG. 4 of the drawing is a rod joint construction 220 of the invention which is generally similar to the tubing joint construction 20, except that the elongated elements frictionally interconnected in end-to-end relation are solid rods, rather than tubings. In view of the similarity between the tubing joint construction 20 and the rod joint construction 220, the components of the latter are identified by reference numerals higher by two hundred than those used in conjunction with the corresponding components of the tubing joint construction 20.

Thus, the rod joint construction 220 includes a rod joint 238 comprising an end portion 224 of a coupling 222 receiving therein an end 228, preferably cold upset, of a solid rod 32. The rod end 228 has an axially tapered surface 242 pressurally interengaged with an axially tapered internal surface 244 of the coupling portion 224. The rod joint 238 may be made up and broken by injecting a fluid under high pressure into the axially central region of the interface between the tapered surfaces 242 and 244 through a port 246 formed in the coupling end 224 and communicating at its inner end with an internal annular distributing groove 248 in the coupling portion 224. A radially-inwardly-converging annular seat 250 is provided at the outer end of the fluid injection port 246 to receive an injection nozzle, not shown. As in the case of the tubing joint construction 20, the two rod ends 228 and 230 are closely spaced within the coupling 222. The coupling 222 is provided therein with a bleed port 252 to drain from the space between the rod ends any injected fluid leaking thereinto so as to prevent a pressure build-up from interfering with making up of the joint 238, or its strength.

In general, the various important considerations hereinbefore discussed in connection with the external-coupling-type tubing joint construction 20 are applicable to the rod joint construction 220. In other words, the same ranges of ratios of axial interface lengths to elongated-element outside diameters, the same ranges of effective coefficients of friction, and the same ranges of included taper angles, are applicable. Additionally, similar material and material-characteristic relationships may be used in the rod joint construction 220. Also, the effective coefficient of friction between the tapered surfaces 242 and 244 may be suitably increased.

The coupling 222 is of constant wall thickness throughout its length so as to develop maximum hoop tension in the coupling end 224. This has effects similar to those hereinbefore discussed in connection with the tubing joint 38.

Although exemplary embodiments of the invention have been disclosed herein for purposes of illustration, it will be understood that various changes, modifications and substitutions may be incorporated in such embodiments without departing from the spirit of the invention.

We claim:

1. A high-strength, friction-type joint for connecting an elongated element, such as a tubing or rod, to another element, including:
   (a) an outer tubular member;
   (b) an inner member;
   (c) one of said members being an end portion of said elongated element;
   (d) an inner, axially tapered surface within said outer member;
   (e) said outer member having a substantially constant wall thickness throughout at least a major portion of the length of said inner tapered surface;
   (f) a complementary outer, axially tapered surface on said inner member;
   (g) said tapered surfaces being pressurally interengaged along an interface therebetween with a high engagement pressure induced by a high hoop tension stress in said outer member and an opposing high compression stress in said inner member; and
   (h) the axial length of said tapered surfaces in pressural interengagement with each other being so related to the engagement pressure between said tapered surfaces and the effective coefficient of friction therebetween as to produce a high frictional resistance to relative bodily displacement of said tapered surfaces at least nearly equal to the nominal yield strength of said elongated element.

2. A high-strength, friction-type joint as defined in claim 1 wherein said outer member is an end portion of a coupling.

3. A high-strength, friction-type joint as defined in claim 1 wherein said inner member is tubular and has a substantially constant wall thickness throughout at least a major portion of the length of said outer tapered surface.

4. A high-strength, friction-type joint as defined in claim 3 wherein said outer member is an end portion of a coupling and said inner member is an end portion of a tubing.

5. A high-strength, friction-type joint as defined in claim 3 wherein said inner member is an end portion of a coupling and said outer member is an end portion of a tubing.

6. A high-strength, friction-type joint as defined in claim 3 wherein said inner and outer members are end portions of tubings.

7. A high-strength, friction-type joint as defined in claim 1 wherein said outer member is an end portion of a coupling and said inner member is an end portion of a rod.

References Cited

UNITED STATES PATENTS

| | | | |
|---|---|---|---|
| 2,142,149 | 1/1939 | Replogle | 285—7 |
| 2,992,479 | 7/1961 | Musser et al. | 29—421 |
| 3,142,901 | 8/1964 | Bodine | 29—525 |
| 2,564,670 | 8/1951 | Bratt | 285—381 X |

FOREIGN PATENTS

| | | |
|---|---|---|
| 682,722 | 10/1939 | Germany. |
| 19,501 | 9/1896 | Great Britain. |
| 825,766 | 12/1959 | Great Britain. |
| 172,146 | 12/1921 | Great Britain. |

THOMAS F. CALLAGHAN, Primary Examiner

U.S. Cl. X.R.

285—370, 381; 287—108, 126

PO-1050
(5/69)

UNITED STATES PATENT OFFICE
CERTIFICATE OF CORRECTION

Patent No. 3,476,413      Dated November 4, 1969

Inventor(s) Clarence J. Coberly and Francis Barton Brown

It is certified that error appears in the above-identified patent and that said Letters Patent are hereby corrected as shown below:

Column 5, line 42, "member" should be --members--
(page 14, line 8);

Column 5, line 42, "thickness" should be --thicknesses--
(page 14, line 8);

Column 9, line 12, "avoiding" should be --avoid--
(page 25, line 7);

Column 11, line 61, "ubing" should be --tubing--
(page 33, line 9);

Column 13, line 16, "32" should be -232--
(page 37, line 16).

Column 14, the three references cited in the Office action dated 8-22-66 have been omitted from the list of "References Cited" at the end of the patent:

| | | | |
|---|---|---|---|
| 2,899,806 | 8-1959 | Fye | 29-427 X |
| 2,926,940 | 3-1960 | Maass | 29-427 X |
| 3,114,566 | 12-1963 | Coberly et al | 285-381 X |

SIGNED AND
SEALED
JUN 2 1970

(SEAL)
Attest:

Edward M. Fletcher, Jr.
Attesting Officer

WILLIAM E. SCHUYLER, JR.
Commissioner of Patents